US008643356B2

(12) United States Patent
Luzzi et al.

(10) Patent No.: US 8,643,356 B2
(45) Date of Patent: Feb. 4, 2014

(54) VOLTAGE REGULATION AND MODULATION CIRCUIT

(75) Inventors: Raimondo Luzzi, Graz (AT); Marco Bucci, Graz (AT); Thomas Baglin, Graz (AT)

(73) Assignee: Infineon Technologies AG, Neubiberg (DE)

( * ) Notice: Subject to any disclaimer, the term of this patent is extended or adjusted under 35 U.S.C. 154(b) by 1018 days.

(21) Appl. No.: 12/574,067

(22) Filed: Oct. 6, 2009

(65) Prior Publication Data

US 2011/0080152 A1    Apr. 7, 2011

(51) Int. Cl.
*G05F 5/00* (2006.01)

(52) U.S. Cl.
USPC .......................................................... 323/299

(58) Field of Classification Search
USPC ............. 323/299; 363/17, 63; 340/10.1–10.4; 235/375, 472; 375/320, 324; 455/41.1, 455/572
See application file for complete search history.

(56) References Cited

U.S. PATENT DOCUMENTS

| 3,525,879 | A | * | 8/1970 | Barbay, Jr. ................ 327/326 |
| 6,414,524 | B1 | * | 7/2002 | Chen ........................... 327/112 |
| 6,636,146 | B1 | * | 10/2003 | Wehoski ..................... 340/10.4 |
| 7,141,939 | B2 |   | 11/2006 | Nagasawa et al. |
| 7,579,881 | B2 | * | 8/2009 | Bach ........................... 327/108 |
| 2009/0108935 | A1 | * | 4/2009 | Kuo et al. .................... 330/254 |

* cited by examiner

*Primary Examiner* — Adolf Berhane
*Assistant Examiner* — Yemane Mehari
(74) *Attorney, Agent, or Firm* — Schiff Hardin LLP

(57) ABSTRACT

A voltage regulation and modulation circuit of a contactless device, including an adjustable impedance circuit configured to maintain an amplitude of an input voltage to be less than an amplitude of a reference voltage; a current buffer circuit coupled between the adjustable impedance circuit and a load, and configured to buffer a supply current, which is output from the adjustable impedance circuit, to the load; and a parallel regulator coupled to an output of the current buffer circuit, and configured to maintain a constant supply voltage at the load.

25 Claims, 11 Drawing Sheets

| n | codeword | adj | $R_{adj}$ | Note |
|---|---|---|---|---|
| 0 | 0000...0000 | 0000...0000 | $R_1\|R_2\|...\|R_N$ | $H_{max}$, startup |
| 1 | 0000...0001 | 1000...0000 | $R_1\|R_2\|...\|R_{N-1}$ | |
| 2 | 0000...0011 | 1100...0000 | $R_1\|R_2\|...\|R_{N-2}$ | |
| 3 | 0000...0111 | 1110...0000 | $R_1\|R_2\|...\|R_{N-3}$ | |
| ... | ... | ... | ... | |
| N-2 | 0011...1111 | 1111...1100 | $R_1\|R_2$ | |
| N-1 | 0111...1111 | 1111...1110 | $R_1$ | $H_{min}$ |

Table 1 – Adjustable resistor control.

Fig. 3A

| i | $C[i] = \sqrt[4]{C[i-1]}$ | ΔC | $R_i$ | $R_{adj}$ |
|---|---|---|---|---|
| 1 | 1 | 1 | $R_1$ | $R_1$ |
| 2 | 1.19 | 0.19 | $R_2 = R_1/0.19$ | $R_1\|\|R_2 = R_1/1.19$ |
| 3 | 1.41 | 0.23 | $R_3 = R_1/0.23$ | $R_1\|\|R_2\|\|R_3 = R_1/1.41$ |
| 4 | 1.68 | 0.27 | $R_4 = R_1/0.27$ | $R_1\|\|R_2\|\|R_3\|\|R_4 = R_1/1.68$ |
| 5 | 2 | 0.32 | $R_5 = R_1/0.32$ | $R_1\|\|R_2\|\|R_3\|\|R_4\|\|R_5 = R_1/2$ |
| ... | ... | ... | | |
| 25 | 64 | 10.18 | $R_{25} = R_1/10.18$ | $R_1\|\|R_2\|\|...\|\|R_{25} = R_1/64$ |

*Table 2 – Adjustable resistor sizing.*

Fig. 3B

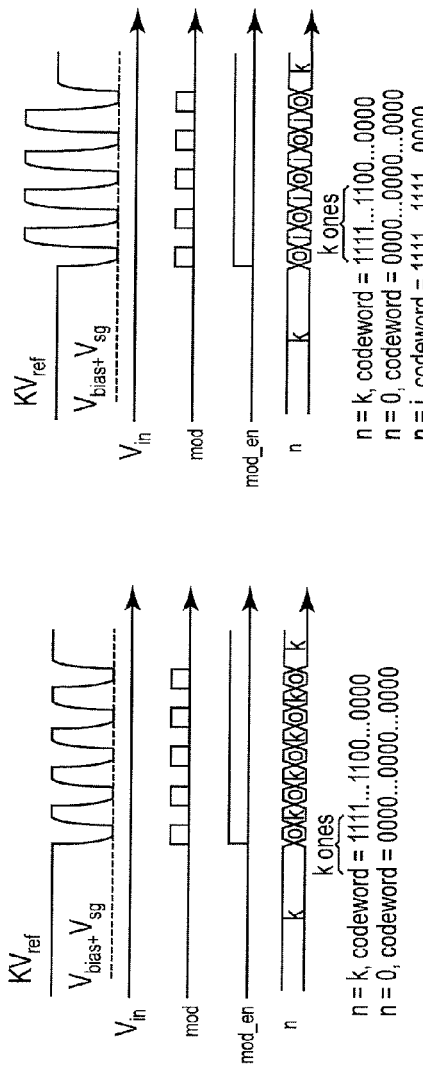
Fig. 5A
Fig. 5B
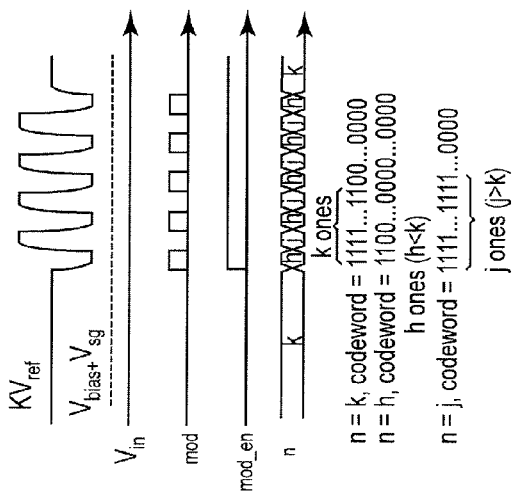
Fig. 5D
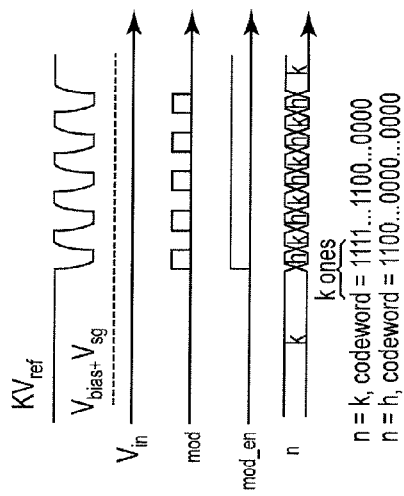
Fig. 5C

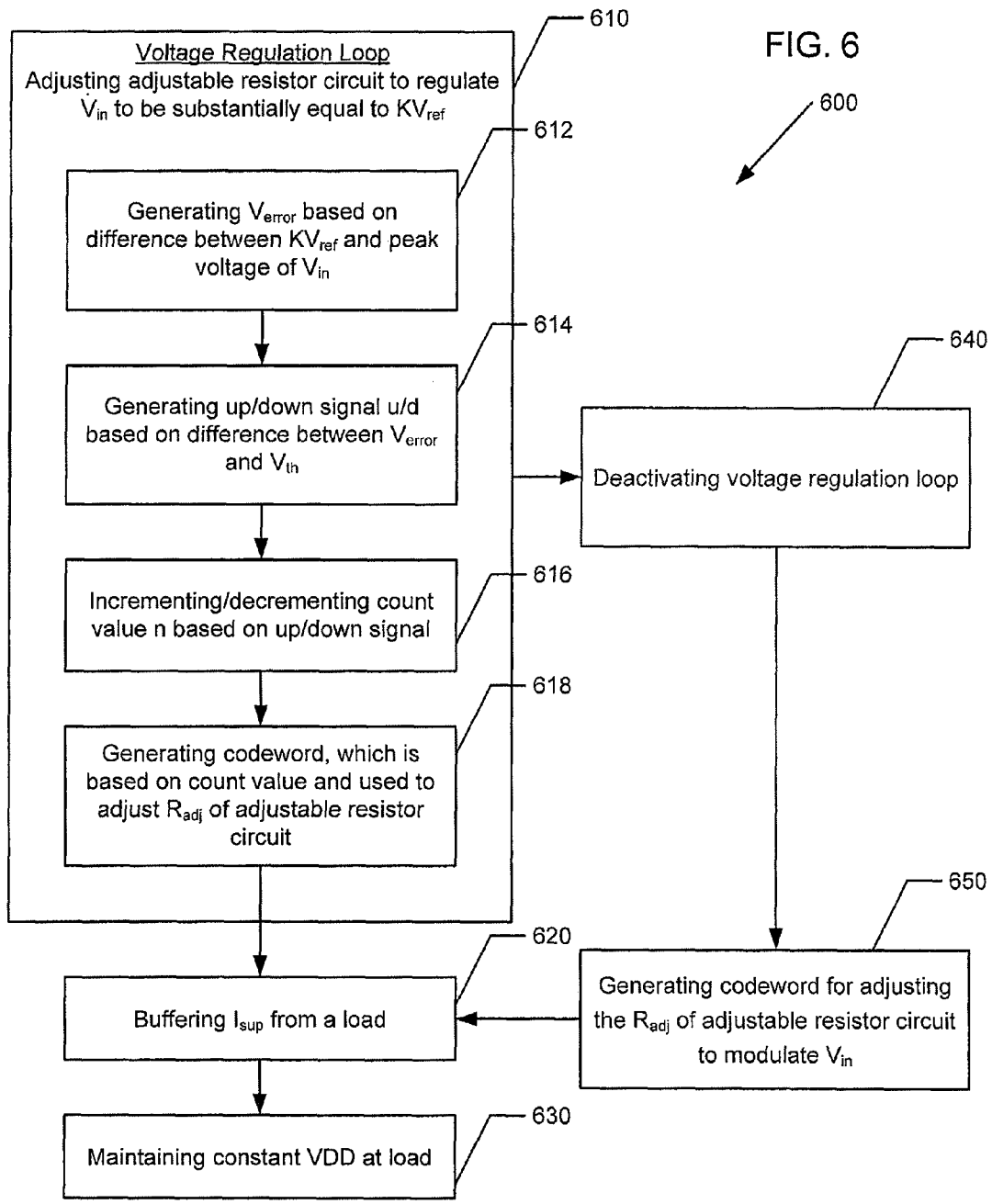

ized by tuning capacitor 722
VOLTAGE REGULATION AND MODULATION CIRCUIT

BACKGROUND

The present application is directed generally to a voltage regulation and modulation circuit of a contactless device in a contactless communication system.

FIG. 7 illustrates a typical contactless system 700 having contactless reader 710 and contactless card 720. Reader 710, also known as a PCD, includes an antenna 712 electrically coupled to an electronic circuit (not shown). Contactless card 720, also known as a smart card, a tag, a PICC, or an RFID card, has inductive antenna 721 and circuitry and microcontroller 740 coupled to inductive antenna 721.

In operation, when contactless card 720 penetrates a transmission field of reader 710, reader antenna 712 transmits to contactless card 720 a carrier signal, which generates a transmission field to supply contactless card 720 with power and data. The transmission field induces a voltage in card antenna 721, and this induced voltage is tuned by tuning capacitor 722 to generate input voltage $V_{in}$. In return, contactless card 720 is capable of transmitting data by load modulating the carrier signal. This load modulated signal is detected by reader antenna 712. The communication between the reader and the contactless card may be defined for example by ISO (International Organization for Standardization) 14443, Type A/B/C, 15693, 18000, etc.

The amplitude of induced input voltage $V_{in}$ in antenna 721 of contactless card 720 experiences significant variations as the distance and orientation of contactless card 720 change with respect to reader 710. In order to protect contactless card 720 from excessive voltages and to support the communication, i.e., modulation/demodulation, between reader 710 and card 720, a regulation of input voltage $V_{in}$ is necessary. Once input voltage $V_{in}$ is regulated, modulation and demodulation can be performed.

In addition, since microcontroller 740 embedded in contactless card 720 shows an impulsive current consumption profile during operation, proper spike suppression measures are necessary in order to avoid communication errors during the phase in which reader 710 is in reception mode, but microcontroller 740 is still operating.

As shown, contactless card 720 has a voltage regulator with an envelope detector which follows the amplitude of input voltage $V_{in}$. The output of the envelope is compared with a reference voltage $KV_{ref}$ and the resulting error signal controls a shunt transistor current, $I_{shunt-2}$, of transistor 733. An additional transistor current, $I_{mod}$, of transistor 736, is used for load modulation and its gate voltage, $V_{mod}$, must be adjusted based on input voltage $V_{in}$ to control the modulation depth. The needed spike suppression is obtained using constant current source 731 to supply microcontroller 740 with a constant supply current, $I_{sup}$, whose value must be adjusted according to the strength of the transmission field. Parallel regulator 735 fixes supply voltage VDD by shunting any excess supply current $I_{shunt-2}$.

The voltage regulation provided by contactless card 720, however, has numerous disadvantages. For example, it is costly in terms of area because it requires field shunt 735, current source 731, modulation transistor 736, and rectifiers, that is diodes 723-728 and capacitances 729, 730. Further, by using a variable current source 733 as a shunting device, the transmitted modulation depth is amplified, effectively distorting the transmission field and requiring additional circuitry to compensate for this effect during reception.

Moreover, field shunt control 734 and supply current $I_{sup}$ control 732 are not independent. Rather, supply current $I_{sup}$ must be adjusted according to the transmission field strength, such as by sensing the shunt current $I_{shunt-1}$ and increasing supply current $I_{sup}$ as long as shunt current $I_{shunt-1}$ is above a predetermined threshold. Further, in order to keep supply current $I_{sup}$ constant, a large capacitance $C_{sup}$ 729 is needed and must be adjusted according to the transmission field strength.

In a weak transmission field, current source 731 must be switched off during a modulation pulse, known as edge-boosting, in order to decrease the input voltage $V_{in}$ rising time, that is the side-bands, and switched on again as soon as input voltage $V_{in}$ reaches the regulation level. This causes overshoots which must be suppressed by keeping field shunt 735 active during communication between reader 710 and contactless card 720.

Finally, using field shunt 735 in parallel with microcontroller 740 requires driving the voltage $V_{shunt}$ at the base of shunt transistor 733 to zero during startup, to assure that contactless card 720 starts in every transmission field condition. As soon as $V_{in}$ increases, field shunt 735 must be fast enough to limit its value. This causes an unavoidable overshoot in input voltage $V_{in}$, and thus requires an additional shunt control circuit 734 at startup, based on a rough reference voltage since $V_{ref}$ is not yet available.

BRIEF DESCRIPTION OF THE DRAWINGS

FIG. 3A illustrates a table of adjustable resistor control according to an exemplary embodiment.

FIG. 3B illustrates a table of adjustable resistor control according to another exemplary embodiment.

FIGS. 5A-5D illustrate timing diagrams of adjustment of modulation levels according to respective exemplary embodiments.

FIG. 6 illustrates a method for performing voltage regulation and modulation in a contactless device.

DETAILED DESCRIPTION

The present application is directed to a voltage regulation and modulation circuit of a contactless device. The circuit includes an adjustable resistor circuit, a current buffer circuit coupled between the adjustable resistor circuit and a load, and a parallel regulator coupled to an output of the current buffer circuit. The circuit performs antenna voltage regulation, power supply control, spike suppression, and load modulation.

Figure 1A:
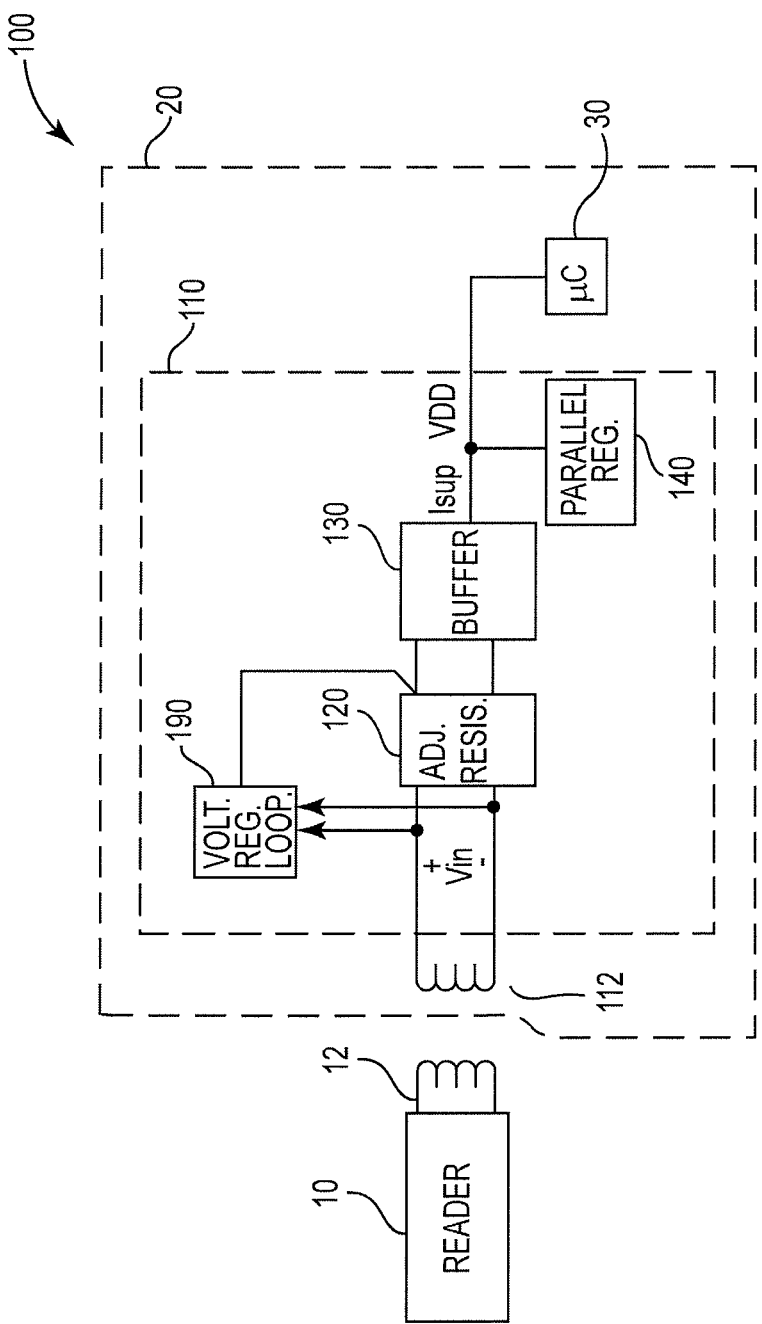
FIG. 1A illustrates a block diagram of a contactless system having a voltage regulation and modulation circuit in accordance with an exemplary embodiment.

FIG. 1A illustrates a block diagram of a contactless system 100 including voltage regulation and modulation circuit 110 in accordance with an exemplary embodiment. Contactless system 100 includes reader 10 having reader antenna 12, and contactless card 20 having card antenna 112, voltage regulation and modulation circuit 110, and microcontroller 30.

Generally, in contactless systems, reader 10 transmits via reader antenna 12 a carrier signal, which generates a radio frequency (RF) field to supply contactless card 20 with power. When contactless card 20 penetrates a transmission field of reader 10, a voltage is induced in card antenna 112 to generate input voltage $V_{in}$. In addition to power, reader 10 may transmit data by modulating the carrier signal with the data, and internal circuitry of contactless card 20 demodulates the modulated carrier signal.

Voltage regulation and modulation circuit 110 in accordance with an exemplary embodiment has two phases, a voltage regulation phase and a modulation phase. At startup, voltage regulation and modulation circuit 110 is in the regulation phase, during which it regulates input voltage $V_{in}$ to a constant value, such as 5V. This regulation phase continues as long as the transmission field is constant, that is, reader 20 and/or contactless card 20 are not transmitting data. During data transmission between reader 10 and contactless card 20, it is not desirable to continue to regulate input voltage $V_{in}$ to a constant value, otherwise the transmitted data would be eliminated. Voltage regulation and modulation circuit 110 therefore switches from the voltage regulation phase to the modulation phase. During the modulation phase, input voltage $V_{in}$ is maintained at the value just prior to the phase switch, and input voltage $V_{in}$ is load modulated by microcontroller 30 to transmit data to reader 10. When data transmission by reader 10 and card 20 ceases, voltage regulation and modulation circuit 110 may return to the voltage regulation phase.

By way of overview, voltage regulation and modulation circuit 110 supplies supply voltage VDD to a load, such as microcontroller 30 in the exemplary embodiment. Voltage regulation and modulation circuit 110 includes adjustable resistor circuit 120 coupled to card antenna 112, current buffer circuit 130 coupled between adjustable resistor circuit 120 and microcontroller 30, parallel regulator 140 coupled to an output of current buffer circuit 130, and voltage regulation loop 190 coupled between an input and adjustment contacts of adjustable resistor circuit 120.

Adjustable resistor circuit 120 is configured to maintain an amplitude of input voltage $V_{in}$, which is induced in card antenna 112, to be less than an amplitude of a reference voltage so as to prevent the input voltage from becoming too high and damaging the chip. This adjustment is accomplished using voltage regulation loop 190, as will be described in detail below.

Current buffer circuit 130, also known as a decoupling circuit, buffers supply current $I_{sup}$, which is output from adjustable resistor circuit 120, to microcontroller 30. As will be described in further detail below, current buffer circuit 130 functions both as a rectifier and as an isolating device for isolating current spikes generated on supply voltage VDD.

Parallel regulator 140 is configured to maintain a constant supply voltage VDD at microcontroller 30. More specifically, parallel regulator 140 shunts from node VDD any current not used by the microcontroller 30.

Figure 1B:
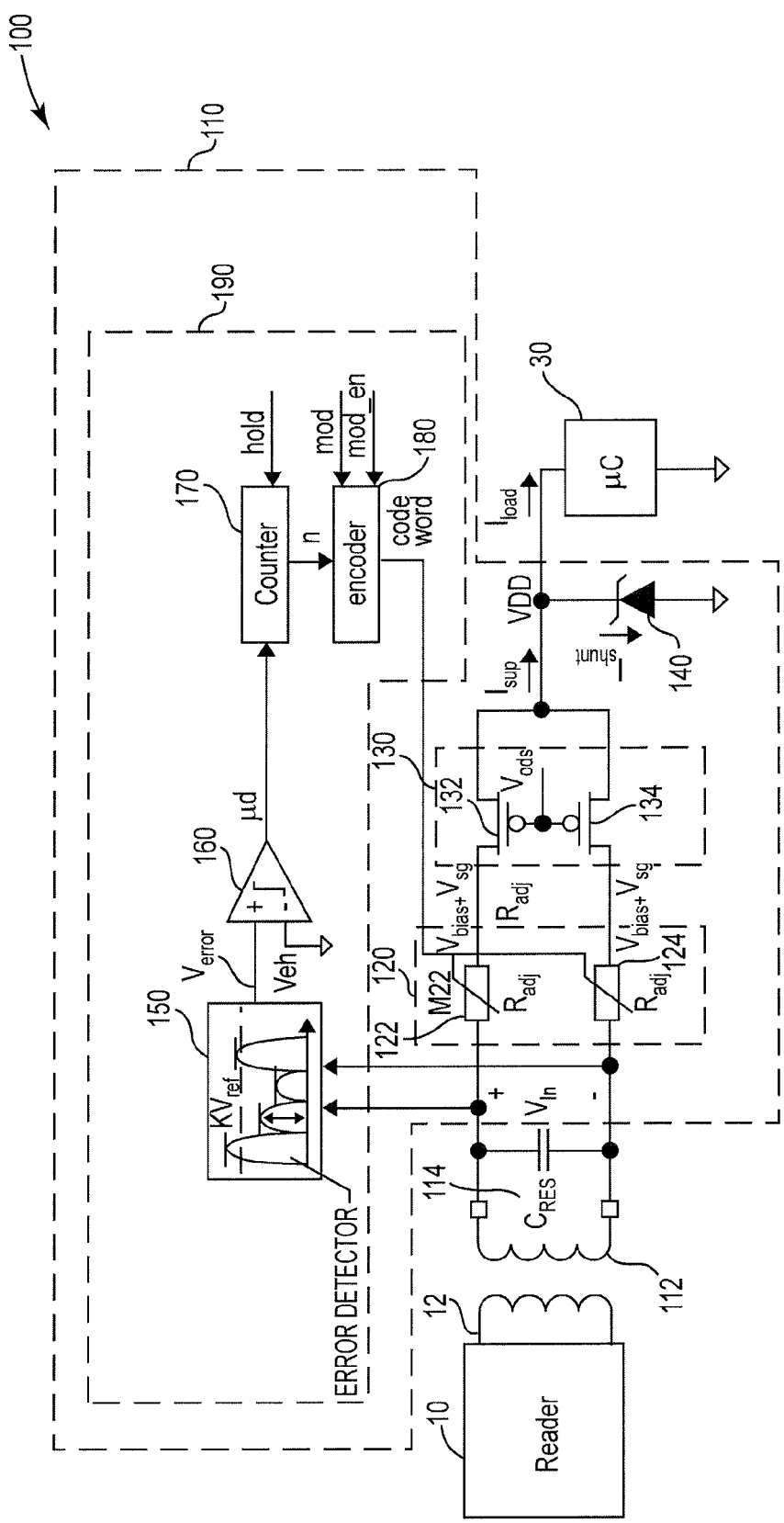
FIG. 1B illustrates a circuit diagram of the contactless system shown in FIG. 1A.

FIG. 1B illustrates a circuit diagram corresponding to the block diagram of the contactless system 100 shown in FIG. 1A. In FIGS. 1A and 1B, like reference numerals designate like elements.

Current buffer circuit 130 includes low voltage PMOS transistors 132, 134 having their gates coupled together forming a node at which bias voltage $V_{bias}$ is applied from circuitry within contactless card 20. PMOS transistors 132, 134 act as isolating devices for current spikes generated on supply voltage VDD because their output supply current $I_{sup}$ is mostly independent from their output voltage (i.e., $V_{bias}+V_{sg}-$ VDD). Low voltage PMOS transistors 132, 134, in conjunction with adjustable resistor circuit 120, guarantee a high spike suppression, for example in the order of greater than 40 dB. Also, low voltage PMOS transistors 132, 134 act as a rectifier by setting bias voltage $V_{bias}$ to be greater than a difference between the amplitudes of supply voltage VDD and threshold voltage $V_{tp}$ (i.e., $V_{bias}$>VDD−$V_{tp}$) to thereby avoid backward current from supply voltage VDD. As is standard, threshold voltage $V_{tp}$, for example 0.6 V, is the amplitude of input voltage at a which PMOS transistors 132, 134 change from one logic state to another.

At the interface between current buffer circuit 130 and adjustable resistor circuit 120, PMOS transistors 132, 134 fix the voltage (i.e., $V_{bias}+V_{sg}$) to a fixed voltage value. The result is that from the perspective of adjustable resistor circuit 120, there is no variation of power consumption of microcontroller 30. Any variations are compensated by parallel regulator 140 and attenuated by PMOS transistors 132, 134 which fix the voltage on the upstream side.

During the voltage regulation phase of voltage regulation and modulation circuit 110, adjustable resistor circuit 120 is configured to maintain an amplitude of input voltage $V_{in}$ induced in card antenna 112 to be less than an amplitude of a reference voltage $KV_{ref}$, where K is a constant, using a codeword generated by regulation loop 190. Adjustable resistor circuit 120 includes two adjustable resistors 122, 124 coupled to the positive and negative inputs, respectively, of card antenna 112. A more detailed description of adjustable resistors 122, 124 is provided below.

As is appreciated, adjustable resistor circuit 120 could alternatively be an adjustable impedance circuit. Also, the two adjustable resistors 122, 124 could be replaced with adjustable impedances. As is known, resistance is defined as an opposition to the flow of electrical current. Impedance is defined as the total opposition, that is resistance and reactance, a circuit offers to the flow of alternating current at a given frequency, where reactance is the opposition to the flow of alternating current.

Voltage regulation loop 190, which is coupled between the input and adjustment contacts of adjustable resistors 122, 124, is configured to output a codeword used to adjust the resistance values of adjustable resistors 122, 124. Voltage regulation loop 190 includes error detector circuit 150, comparator 160, counter circuit 170, and encoder 180, coupled in series.

Error detector circuit 150 is configured to determine an error between the amplitudes of input voltage $V_{in}$ and reference voltage $KV_{ref}$. Error detector circuit 150 has an input coupled to the input of adjustable resistor circuit 120 for receiving input voltage $V_{in}$, and an output for outputting error voltage $V_{error}$. Specifically, error voltage $V_{error}$ represents a difference between the amplitude of reference voltage $KV_{ref}$ and a peak amplitude of input voltage $V_{in}$ (i.e., $KV_{ref}-V_{in}$). K in $KV_{ref}$ is an amplification factor, which may be any value deemed appropriate.

Comparator 160 is configured to determine whether error voltage $V_{error}$ is positive or negative so that regulation loop 190 can adjust input voltage $V_{in}$ in the correct direction. Error voltage $V_{error}$, including its sign, positive or negative, is input to a non-inverting input of comparator 160, and threshold voltage $V_{th}$, which is the exemplary embodiment is ground, is input to an inverting input. As a result, when the amplitude of error voltage $V_{error}$ is greater than the amplitude of threshold voltage $V_{th}$ (i.e., is positive), the up/down signal u/d output from comparator 160 will be a high signal, representative of a logical 1. Conversely, when the amplitude of error voltage $V_{error}$ is less than the amplitude of threshold voltage $V_{th}$ (i.e., is negative), the up/down signal u/d output from comparator 160 will be a low signal, representative of a logical 0. Comparator 160 may be an operational amplifier, or any other device suitable for the intended purpose.

Counter circuit 170 is configured to determine a count value n, which will be used as a basis for adjusting adjustable resistors 122, 124. Counter circuit has an input coupled to the output of comparator 160 for receiving up/down signal u/d. When up/down signal u/d is a logical 1, counter circuit 170 increases count value n by a step, and when up/down signal u/d is a logical 0, counter circuit 170 decreases count value n by a step. As will be explained in detail below, increasing count value n will result in an increase in resistance value $R_{adj}$ of adjustable resistors 122, 124 and a corresponding increase in input voltage $V_{in}$.

Counter circuit 170 also has a hold input, the function of which will be explained below with respect to the modulation phase of regulation and modulation circuit 110. Also, as will be discussed below with respect to FIGS. 4A and 4B, counter circuit 170 may be linear or geometrically progressive.

Encoder 180 has an input for receiving count value n from counter circuit 170, and output for outputting a corresponding codeword. This codeword is used to adjust the resistance value $R_{adj}$ of adjustable resistors 122, 124. Basically, voltage regulation loop 190 causes encoder 180 to set the value of its codeword such that the resistance value $R_{adj}$ of adjustable resistor circuit 120 increases when the amplitude of input voltage $V_{in}$ is less than the amplitude of reference voltage $KV_{ref}$. Further details regarding the operation of encoder 180 will be discussed below with respect to FIGS. 2A-C and 3A-B. Also, encoder 180 also has a modulation input and a modulation enable input, the functions of which will be explained below with respect to the modulation phase of regulation and modulation circuit 110.

Voltage regulation loop 190 functions as a feedback loop, and if the amplitude of input voltage $V_{in}$ increases, the resistance value $R_{adj}$ of adjustable resistor circuit 120 should be decreased. The specific implementations of the components of voltage regulation loop 190, that is error detector circuit 150, comparator 160, counter circuit 170, and encoder 180, are design specific.

Figure 2A:
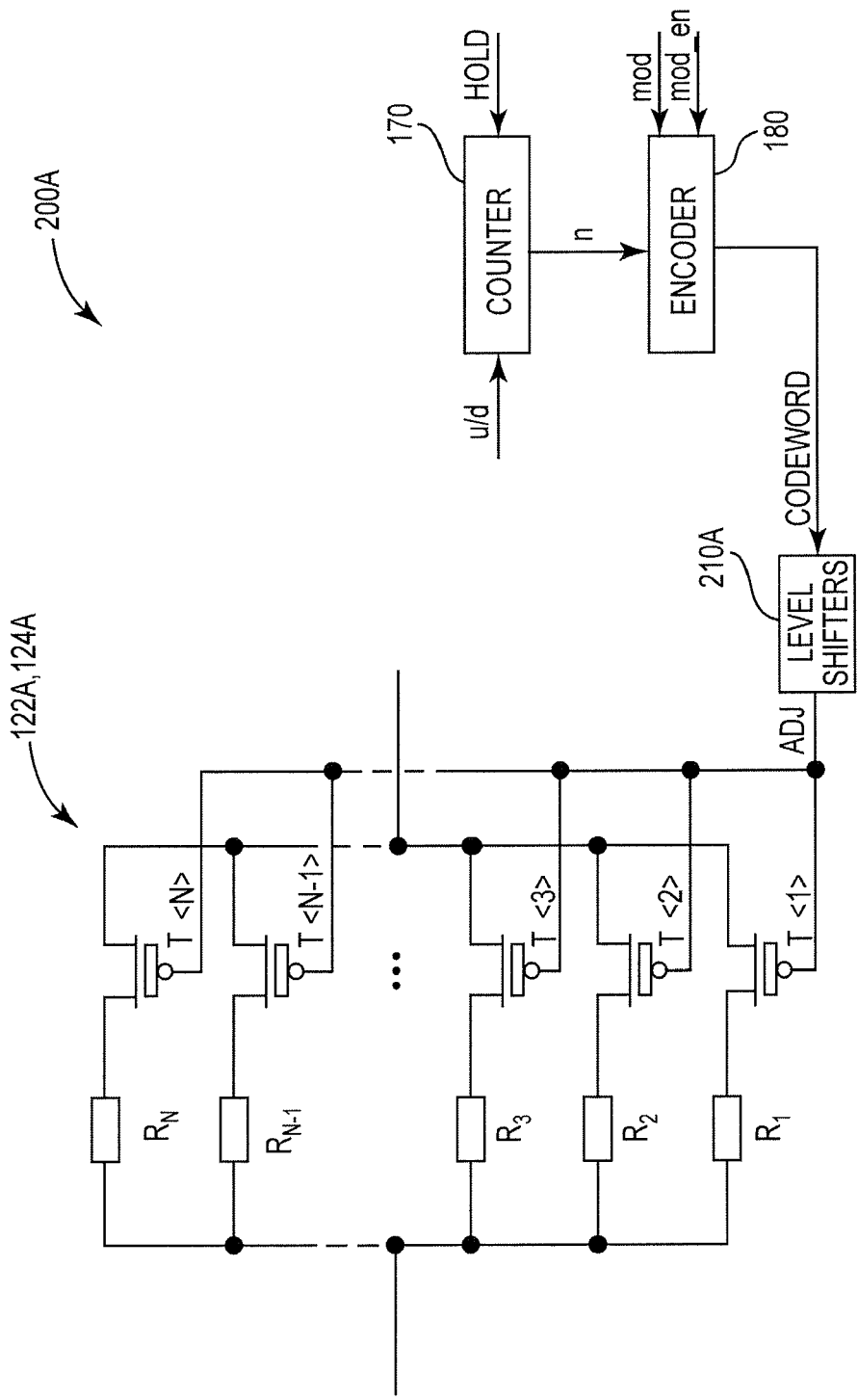
FIGS. 2A-2C illustrate circuit diagrams of adjustable resistors in accordance with respective exemplary embodiments.
Figure 2B:
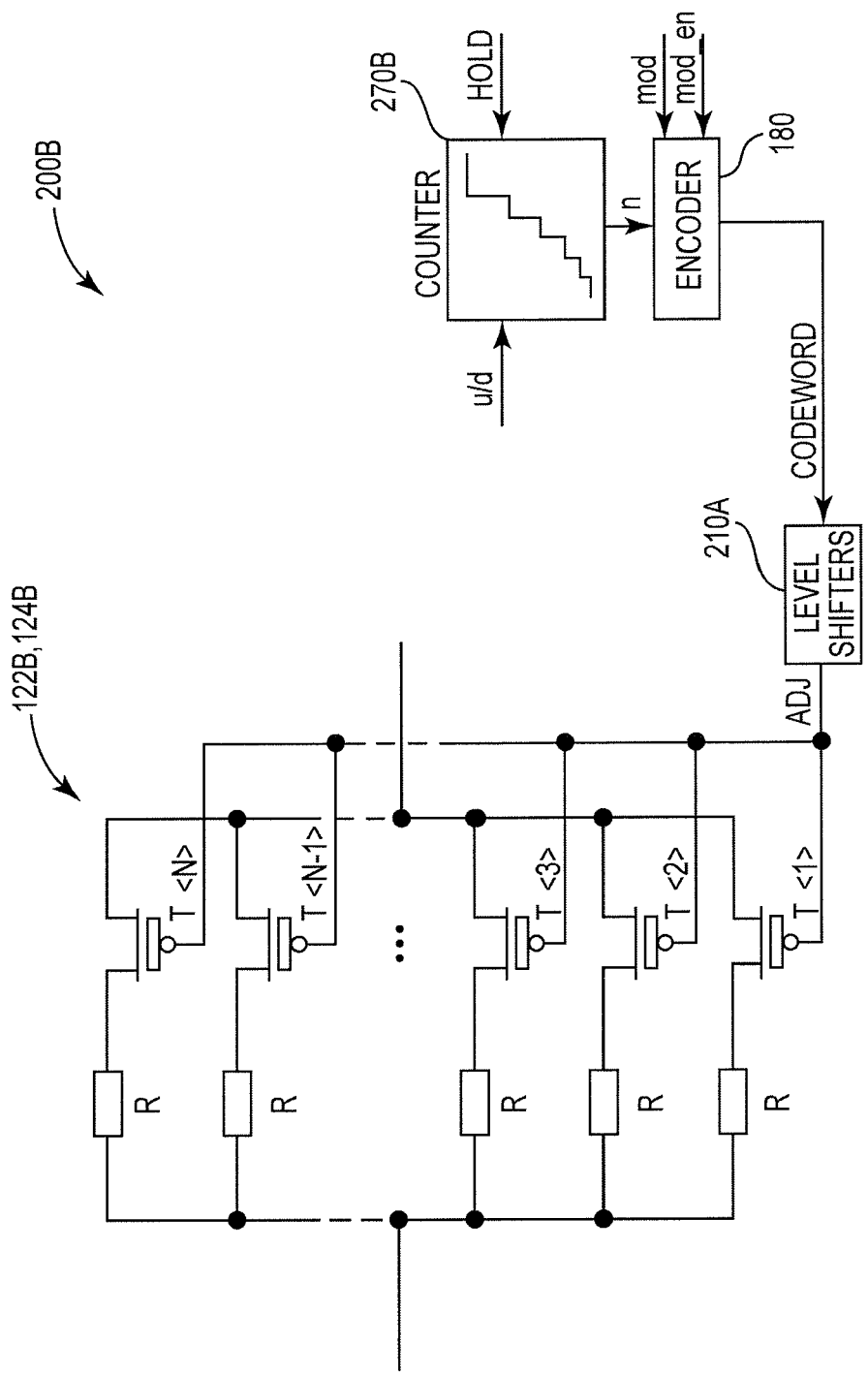
Figure 2C:
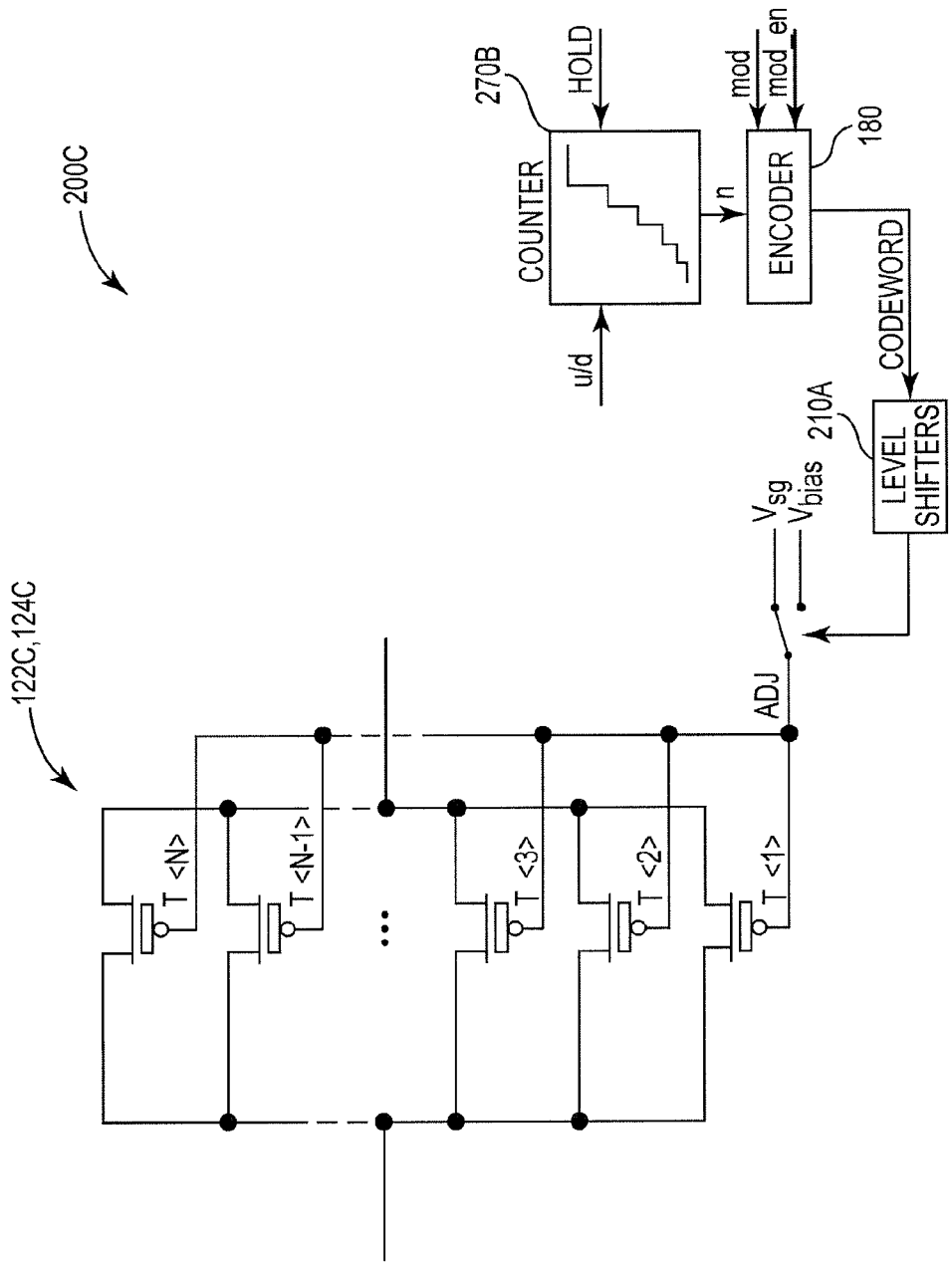

FIGS. 2A-C illustrate circuit diagrams of adjustable resistors 122, 124 in accordance with respective exemplary embodiments, as described in the following paragraphs.

FIG. 2A illustrates a circuit 200A providing an exemplary embodiment of adjustable resistors of contactless system 100. As should be apparent, adjustable resistor 122A, 124A, may be either adjustable resistor 122 or adjustable resistor 124 shown in FIG. 1B.

Adjustable resistor 122A, 124A includes a plurality of resistor units $R_1$ through $R_N$ coupled in parallel, and a plurality of medium voltage PMOS transistors respectively coupled in series with the plurality of resistor units $R_1$ through $R_N$. Medium voltage PMOS transistors $T_{<1>}$ through $T_{<N>}$ act as switches to essentially turn the respective resistor units $R_1$ through $R_N$ on or off, thereby changing the value of the total resistance $R_{adj}$ of the adjustable resistor 122A, 124A. As is known from basic circuit theory, increasing the number of parallel resistor units $R_1$ through $R_N$ activated results in the total adjustable resistance $R_{adj}$ decreasing.

In one embodiment, respective resistor units $R_1$ through $R_N$ have geometrically progressive resistance values, as will be discussed in detail below with respect to Table 2 shown in FIG. 3B. Also, counter circuit 170 (shown in FIG. 1B) is linear, that is, each of the steps have equivalent values.

Level shifters 210A are coupled between encoder circuit 180 (shown in FIG. 1B) and adjustable resistor 122A, 124A, and are configured to compensate for the fact that PMOS transistors $T_{<1>}$ through $T_{<N>}$ are high voltage devices, whereas encoder 180 and counter circuit 170 are supplied with a low voltage level. More specifically, level shifters 210A are used to switch the PMOS transistors $T_{<1>}$ through $T_{<N>}$ between VSS and a high voltage following $V_{in}$.

FIG. 2B illustrates circuit 200B providing an alternative exemplary embodiment of adjustable resistors of contactless system 100. As opposed to the geometrically progressive resistor units $R_1$ through $R_N$ shown in FIG. 2A, resistor units R of adjustable resistor 122B, 124B have substantially equivalent resistance values. However, a geometric progression is implemented using a geometrically progressive counter circuit 270B as opposed to the linear counter circuit 170 of FIG. 2A. The number of resistor units is $2^{N/4}$, where N is the number of resistors in FIG. A, and counter circuit 270B is a (N/4)-bit counter. Level shifters 210A are the same as shown in FIG. 2A. The regularity of circuit 200B is advantageous in terms of matching and layout optimization.

FIG. 2C illustrates circuit 200C providing another exemplary embodiment of adjustable resistors of contactless system 100 according to an alternative exemplary embodiment. Circuit 200C is basically the same as circuit 200B of FIG. 2B, with a main difference being that there are no resistor units. Instead, PMOS transistors $T_{<1>}$ through $T_{<N>}$ of adjustable resistor 122C 124C are biased in a triode region to act as resistors. This is accomplished by switching the control of the gates of PMOS transistors $T_{<1>}$ through $T_{<N>}$ between input voltage $V_{in}$ and a bias voltage $V_{bias}$ to put the transistors in triode region to obtain a desired resistance.

It should be appreciated that circuits 200A-C are not limited to having the switches implemented as PMOS transistors. The switches may alternatively be implemented using NMOS transistors, or any other element suitable for the intended purpose. Also, circuits 200A-C may alternatively be designed such that the resistors are replaced with capacitors.

FIG. 3A illustrates Table 1 for adjustable resistor control according to an exemplary embodiment. Table 1 shows the relationships among counter circuit 170 output n, encoder 180 output (codeword), "adj" representing which of resistor units of resistors 122, 124 will be turned on/off, the corresponding values for $R_{adj}$, and notes. In a strong transmission field, the counter value n will be low, resulting in to a low value for $R_{adj}$. Conversely, in a weak transmission field, the counter value will be high, resulting in a high value for $R_{adj}$.

When count value n is output from counter circuit 170, encoder 180 outputs a corresponding codeword. This codeword is then used by adjustable resistor circuit 120 to set the resistance value for each of adjustable resistors 122, 124. The resistance values are set by switching each of PMOS transistors $T_{<1>}$ through $T_{<N>}$ shown in either of FIGS. 2A-C, on or off. Since transistors $T_{<1>}$ through $T_{<N>}$ are PMOS transistors in the exemplary embodiment, a high voltage represented by logic 1 applied at a base of a transistor T turns the respective transistor off, and a low voltage represented by logic 0 applied at the base of transistor T results in the transistor being turned on. When a transistor T is turned off, its respective resistor R does not contribute to the resistance value $R_{adj}$ of the adjustable resistor 122, 124. On the other hand, when a transistor T is turned on, its respective resistor R does contribute.

By way of example, when counter circuit 170 outputs count value n=0, encoder 180 converts this count value to codeword 0000 . . . 0000. This means that each of transistors $T_{<1>}$ through $T_{<N>}$ will have a logical 0 applied to its base activates the respective transistors, which results in all of the parallel resistor units R, or $R_1$ through $R_N$, contributing to the adjustable resistance value $R_{adj}$ of adjustable resistors 122, 124. The result is a lowest possible resistance value for each of adjustable resistors 122, 124.

It is noted that at startup, voltage regulation loop 190 is configured to cause encoder 180 to set the value of the codeword such that the adjustable resistance value $R_{adj}$ of each of adjustable resistors 122, 124 is this lowest resistance value. All of the current from card antenna 112 is therefore provided at node VDD, and there will be a correct startup for any transmission field condition. Also, in strong transmission field, count value n is set to be low, which corresponds to a low value for adjustable resistance $R_{adj}$.

By way of another example, when counter circuit 170 outputs count value n=N−1, encoder 180 converts this count value to codeword 0111 . . . 1111. This means that all but one of PMOS transistors $T_{<1>}$ through $T_{<N>}$ will have a logical "1" applied to their respective bases turning the respective transistors off. As a result, only one of the resistor units R contributes to the resistance values of the adjustable resistors 122, 124. The result is a highest possible adjustable resistance value $R_{adj}$, that is, only resistor $R_1$ contributes to the resistance value $R_{adj}$ of each of adjustable resistors 122, 124. Effectively, resistance value $R_{adj}$ is equal to $R_1$. It is noted that in a weak field, count value n is high, which corresponds to a high value for adjustable resistance $R_{adj}$.

FIG. 3B illustrates Table 2 for adjustable resistor control in order to obtain a voltage step for $V_{in}$ that is independent from the field strength. Thus, resistance values of resistor units $R_i$, where i=1, . . . N, are chosen according to the geometric progression shown in Table 2. The significance of Table 2 versus Table 1 is that when the count value n increases by one step up or one step down, there is not a same change in amplitude of input voltage $V_{in}$, but rather a same change in percentage of variation of amplitude of input voltage $V_{in}$. In other words, in a weak field the step could be a particular value, and in a strong field a different value; in a weak field when the counter steps up or down the step is large, but in a strong field the step is small. Since it is preferable to have the same change in step in both weak and strong fields, in Table 2, the resistance values of resistor units $R_i$ have geometrically progressive values based on the square root shown in the second column. "C" represents a coefficient used to scale the respective resistors $R_i$, and its particular value is merely a matter of design choice.

The resistors $R_i$ are scaled starting with a minimal conductance with $R_1$, and then have a progression 1, 1.19, 1.41, 1.68, and 2. The base resistance $R_1$, which is always active, is sized considering the peak antenna current in a minimum supported transmission field, for example, for $H_{min}$=0.5 A/m, $I_{sup}$=3 mA, and to be able to regulate the amplitude of $V_{in}$ up to about 6V, $R_1$=1.4 KΩ (for $V_{bias}+V_{sg}$=1.8V). As can be seen, in the exemplary embodiment there are four intervals between doubling of coefficient values.

Figure 4:
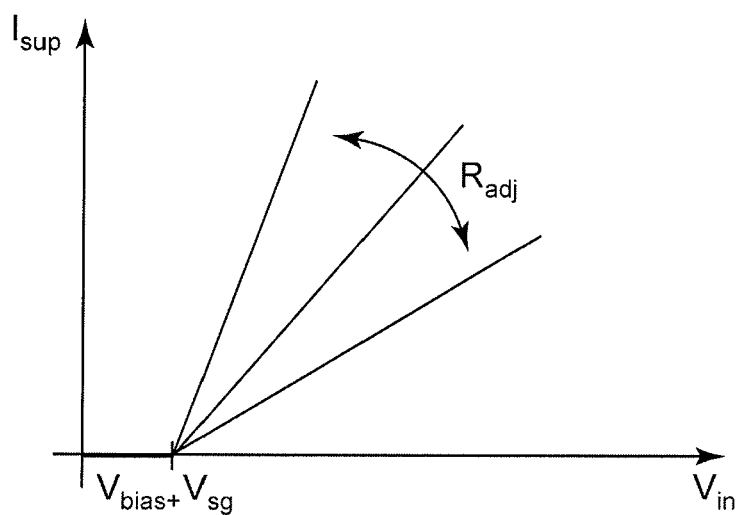
FIG. 4 illustrates a graph showing the relationship between supply current and input voltage as resistance of an adjustable resistor shown in one of FIGS. 2A-2C changes.

FIG. 4 illustrates a graph showing the relationship between supply current $I_{sup}$, input voltage $V_{in}$, and adjustable resistance value $R_{adj}$ of adjustable resistors 122, 124. As can be seen, the amplitude of input voltage for the lowest adjustable resistance value $R_{adj}$ of adjustable resistors 122, 124 is the sum of the amplitudes of bias voltage and the source gate voltage $V_{sg}$ (i.e., $V_{bias}+V_{sg}$) of low voltage PMOS transistors 132, 134. Since the load from microcontroller 30 shown to the transmission field is an adjustable resistor, when the amplitude of the input voltage $V_{in}$ is greater than a sum of the amplitudes of bias voltage $V_{bias}$ and source gate voltage $V_{sg}$ of PMOS transistors 132, 134 (i.e., $V_{in}>V_{bias}+V_{sg}$), a modulation depth from reader 10 corresponds to substantially the same modulation depth on the input voltage $V_{in}$, and thus the transmission field is not appreciably distorted. This is particularly important when there are multiple contactless cards in the field.

As mentioned above, voltage regulation and modulation circuit 110 has two phases, a regulation phase and a modulation phase. The modulation phase begins when reader 10 and contactless card 20 begin data transmission. Voltage regulation and modulation circuit 110 switches from the regulation phase to the modulation phase, and the input voltage $V_{in}$ at the regulated value just prior to data transmission is maintained.

Referring again to FIG. 1B, during the start of the modulation phase, a hold signal (hold) having a logical 1 is input to the hold input of counter circuit 170, thereby disabling counter circuit 170 and effectively inactivating voltage regulation loop 190. The amplitude if input voltage $V_{in}$ is maintained at the regulated value just prior to the start of the modulation phase. Also, a modulation enable signal (mod_en) having a logical 1 is input to the modulation enable input of encoder 180, thereby enabling modulation. Furthermore, a modulation signal, mod, representing data by a series of logical 1s and 0s is input to modulation input of encoder 180.

It should be noted that for the regulation phase discussed above, the hold signal (hold), modulation enable signal (mod_en), and modulation signal (mod) are each a logical 0. Counter circuit 170 is enabled and modulation is disabled, and thus encoder circuit 180 is controlled by count value n from counter circuit 170 only.

The hold signal (hold), modulation enable signal (mod_en), and modulation signal (mod) are generated and transmitted by microcontroller 30. Further description of the generation and transmission of these signals is not provided as the details are beyond the scope of this application, and should be known by those of skill in the art.

During the modulation phase, data modulation is performed on the input voltage $V_{in}$ by adjusting resistance values $R_{adj}$ of adjustable resistors 122, 124. More specifically, a modulation signal mod having data is received at modulation input of encoder 180. Encoder 180 then uses the modulation signal data, rather than counter value n from counter circuit 170, to generate codewords used to adjust resistance values $R_{adj}$ of adjustable resistors 122, 124. The modulation is thus performed by digitally controlling adjustable resistor circuit 120, with no additional analog device required for modulation.

FIGS. 5A-D illustrate timing diagrams of adjustment of modulation levels during the modulation phase according to exemplary embodiments. As will be discussed in the following paragraphs, FIG. 5A illustrates negative modulation, FIG. 5B illustrates a combination of positive and negative modulation, FIG. 5C illustrates modulation in which input voltage $V_{in}$ is modulated to less than a minimum value, and FIG. 5D illustrates a combination of the modulations illustrated in FIGS. 5B and 5C.

FIG. 5A is a timing diagram illustrating negative modulation according to an exemplary embodiment. As can be seen in the upper portion of the timing diagram, input voltage $V_{in}$ is regulated to reference voltage $KV_{ref}$ during the voltage regulation phase, and then maintained as a base voltage during the modulation phase. When the modulation phase begins, a modulation enable signal (mod_en) input at the modulation enable input of encoder 180 becomes a logical 1 thereby enabling modulation. Concurrently, a modulation signal (mod) begins to transition between a logical 0 and a logical 1, representing data to be modulated onto input voltage $V_{in}$.

Counter value n is shown in the lower portion of the timing diagram. During the voltage regulation phase counter value n is fixed at a value k, so in the upper portion of the timing diagram, the transmission field is regulated to the fixed value $KV_{ref}$, for example 5V. More specifically, counter value k causes encoder 180 to output codeword 1111 . . . 1100 . . . 0000, as shown at the bottom of FIG. 5A, and the resistors units R, or $R_1$ through $R_N$, of adjustable resistors 122, 124 corresponding to the is are switched off via respective PMOS transistors T in the manner discussed above. The adjustable resistance $R_{adj}$ of adjustable resistors 122, 124 is therefore at a higher value, resulting in the amplitude of input voltage $V_{in}$ being equivalent to the higher amplitude of reference voltage $KV_{ref}$.

When the modulation phase begins, modulation enable signal mod_en transitions to a logical 1, and modulation signal mod begins. Counter value n is forced from a value k to a value 0, not by counter circuit 170, but within encoder 180 based on modulation signal mod. Encoder 180 outputs a codeword 0000 . . . 0000 . . . 0000 corresponding to counter value 0, and the corresponding parallel resistor units R, or $R_1$ through $R_N$, of adjustable resistors 122, 124 are switched on via respective PMOS transistors T, as described above, resulting in a minimum adjustable resistance value $R_{adj}$ of adjustable resistors 122, 124. The adjustable resistance value $R_{adj}$ thereby causes the amplitude of input voltage $V_{in}$ to decrease to the minimum value, that is a sum of the amplitudes of bias voltage $V_{bias}$ plus source gate voltage $V_{sg}$ (i.e., $V_{bias}+V_{sg}$) of PMOS transistors 132, 134, as discussed above with reference to FIG. 4.

Subsequently, counter value n is restored to k, and the amplitude of the input voltage $V_{in}$ returns back to the amplitude of the regulated reference voltage $KV_{ref}$. Modulation signal, mod, controls the switching of the counter value between 0 and k, and thus the switching of modulated input voltage $V_{in}$ between $KV_{ref}$ and the minimum voltage value, $V_{bias}+V_{sg}$. In the lower portion of the timing diagram 0k0k0k represents the switching of the counter value n, so the counter value n counts to k and then returns to 0 again. During the modulation phase, counter value n does not count up and down by one step, but is instead forced between 0 and k by modulation signal mod.

FIG. 5B is a timing diagram illustrating a combination of negative and positive modulation according to an alternative exemplary embodiment, to thereby increase the depth of the modulation. The modulation is greater in that instead of switching counter value n between values 0 and k, as described above with respect to FIG. 5A, switching is between values 0 and j, for example, where j is greater than k. This means the number of resistor units R connected in parallel is reduced and the resistance is increased as compared with the previous example illustrated in FIG. 5A. The switching of modulated input voltage $V_{in}$ is therefore between the minimum voltage value, $V_{bias}+V_{sg}$, and a value greater than $KV_{ref}$. This combination of negative and positive modulation is used when it is desired to increase sidebands of input voltage $V_{in}$, for example in a case of a weak field when the contactless card is located far from reader 10, or the contactless card has a smaller antenna.

FIG. 5C illustrates modulation that is similar to the negative modulation shown in FIG. 5A, but instead of input voltage $V_{in}$ being modulated down to the minimum voltage value, $V_{bias} V_{sg}$, it is modulated to a value that is greater than minimum. This is accomplished by switching counter value between values k and h, rather than between values k and 0, where h is less than k but greater than 0. As shown, for count value h, encoder 180 outputs codeword 1100 . . . 0000 . . . 0000, and thus fewer resistor units R are turned on as compared with the situation when count value is 0. The result is that modulated input voltage $V_{in}$ is switched between $KV_{ref}$ and a voltage value that is between $KV_{ref}$ and the minimum voltage value, $V_{bias} V_{sg}$.

FIG. 5D illustrates a modulation that is a combination of the modulations illustrated in FIGS. 5B and 5C, that is, modulation that is both negative and positive and is not modulated to a lowest voltage level, according to an alternative exemplary embodiment. One of ordinary skill would understand how to implement this modulation based on the descriptions provided above, and thus a more detailed description here is not necessary.

FIG. 6 illustrates a method 600 for performing voltage regulation and modulation in a contactless device. First adjustable resistor circuit 120 is adjusted to regulate the amplitude of input voltage $V_{in}$, which is induced in card antenna 112, to be substantially equal to the amplitude of reference voltage $KV_{ref}$ (Step 610). Then, supply current $I_{sup}$, which is output by adjustable resistor circuit 120, is buffered from the load, that is microcontroller 30 (Step 620). Finally, a constant supply voltage VDD is maintained at microcontroller 30, by parallel regulator circuit 140 (Step 630).

The adjusting step 610 involves performing voltage regulation loop 190 including generating error voltage $V_{error}$ based on a difference between the amplitude of reference voltage $KV_{ref}$ and a peak amplitude of input voltage $V_{in}$ (i.e., $KV_{ref}-V_{in}$) (Step 612), generating an up/down signal u/d based on a difference between the amplitudes of error voltage $V_{error}$ and threshold voltage $V_{th}$ (Step 614), incrementing/decrementing count value n based on up/down signal u/d (Step 616), and generating a codeword, which is based on count value n and used to adjust resistance value $R_{adj}$ of the adjustable resistor circuit 120 (Step 618).

During data communication by the contactless device, voltage regulation loop 190 is deactivated (Step 640), and a codeword is generated for adjusting resistance value $R_{adj}$ of adjustable resistor circuit 120 to modulate input voltage $V_{in}$ (Step 650), either negatively, or both negatively and positively. Also, the codeword may be generated to adjust resistance value $R_{adj}$ of adjustable resistor circuit 120 to its lowest resistance value, $V_{bias}+V_{sg}$.

There are numerous advantages to voltage regulation and modulation circuit 110 as described herein. For example, the linearity of contactless system 100 is improved. Since the load of microcontroller 30 shown to the transmission field is an adjustable resistor circuit 120 when the amplitude input voltage $V_{in}$ is greater than a sum of the amplitudes of bias voltage $V_{bias}$ and source gate voltage $V_{sg}$ of low voltage PMOS transistors 132, 134 (i.e., $V_{in} V_{bias}+V_{sg}$), a modulation depth from reader 10 corresponds to substantially the same modulation depth at card antenna 112. The transmission field is therefore not appreciably distorted.

Also, auto-startup of contactless card 20 is improved. Since all of the current induced at card antenna 112 is available as supply current $I_{sup}$, a correct startup is guaranteed in all transmission field conditions by simply setting adjustable resistors 122, 124 to their lowest resistance values $R_{adj}$. No additional startup circuit is required and there are no significant overshoots on $V_{in}$.

Figure 7:
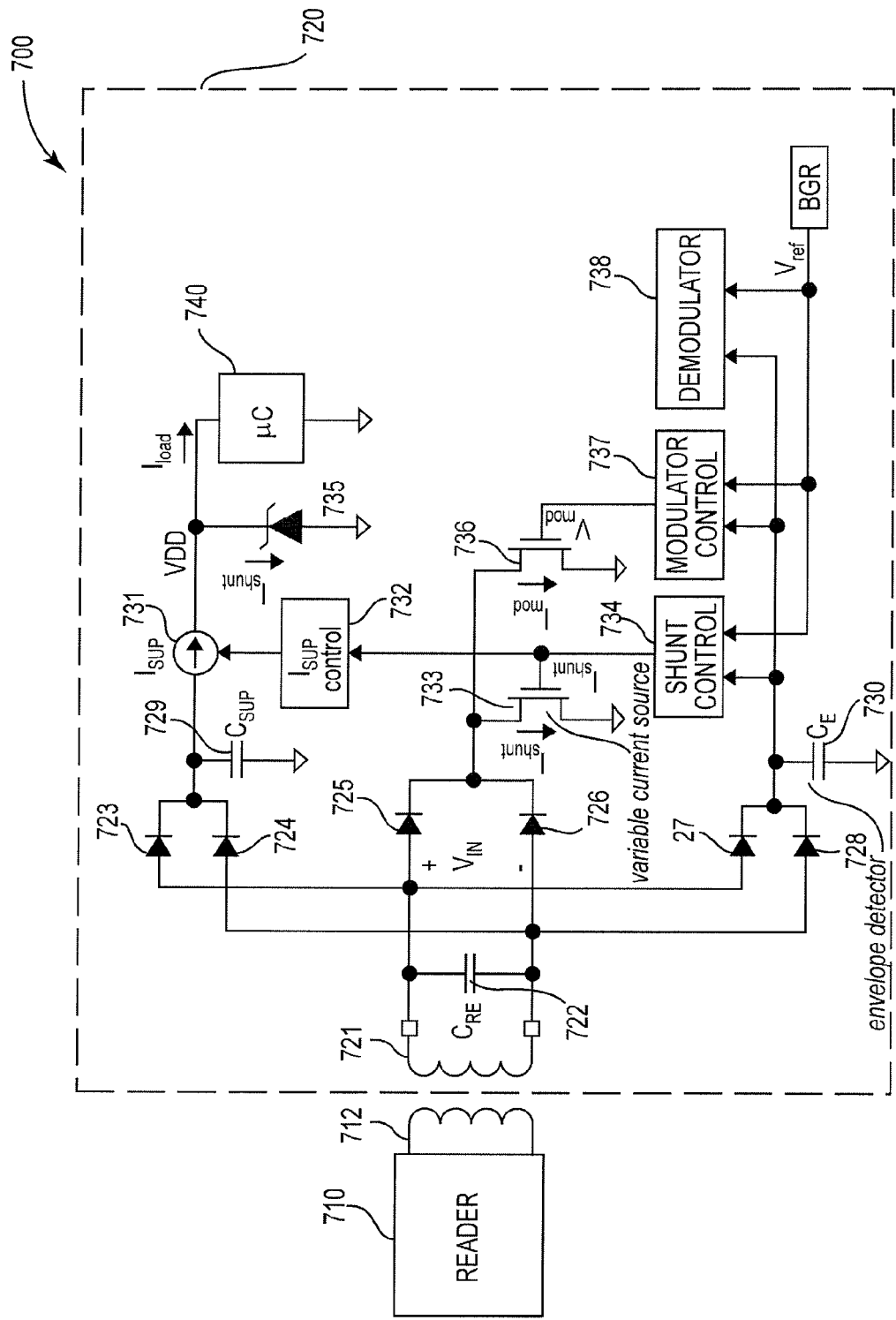
FIG. 7 illustrates a contactless system having a typical voltage regulator.

Further, load modulation is accomplished by setting adjustable resistance $R_{adj}$ to a minimum using the codeword from encoder 180. Since the amplitude of input voltage $V_{in}$ cannot be lower than a sum of the amplitudes of bias voltage $V_{bias}$ and source gate voltage $V_{sg}$ of PMOS transistors 132, 134 (i.e., $V_{bias}+V_{sg}$), the modulation depth is controlled without requiring an additional voltage regulation loop. Increased modulation levels can be obtained by adding or subtracting one or more steps from the adjustable resistor control as shown in FIGS. 5A-D. This is possible since, due to the implementation of adjustable resistors 122, 124, as shown in FIGS. 2A-C, the voltage step on $V_{in}$ around a regulation voltage $KV_{ref}$ is constant and independent of transmission field strength. Moreover, since supply current $I_{sup}$ is not derived from a capacitance, as in FIG. 7, no special "edge-boosting" features are required to obtain a sharp rising edge.

It should be understood that the invention is not limited to being implemented in a contactless card. The invention may be implemented an any contactless device performing voltage regulation and modulation/demodulation.

Also, the term "adjusting" when used in the context of adjusting resistance values of resistors of adjustable resistor circuit 120 is not limited to the situations when an actual adjustment is necessary. It should be understood and appreciated that the term "adjusting" also applies to those instances when voltage regulation and modulation circuit 110 determines that the resistance values are at the desired values, and no adjustment needs to be made at those times.

Although specific embodiments have been illustrated and described herein, it will be appreciated by those of ordinary skill in the art that a variety of alternate and/or equivalent implementations may be substituted for the specific embodiments shown and described without departing from the scope of the present application. This application is intended to cover any adaptations or variations of the specific embodiments discussed herein.

What is claimed is:

1. A voltage regulation and modulation circuit of a contactless device, comprising:
    an adjustable impedance circuit configured to maintain an amplitude of an input voltage to be less than an amplitude of a reference voltage;
    a current buffer circuit coupled between the adjustable impedance circuit and a load, and configured to buffer a supply current, which is output from the adjustable impedance circuit, to the load; and
    a parallel regulator coupled to an output of the current buffer circuit, and configured to maintain a constant supply voltage at the load.

2. The voltage regulation and modulation circuit of claim 1, wherein the current buffer circuit comprises low voltage PMOS transistors.

3. The voltage regulation and modulation circuit of claim 2, wherein a gate bias voltage of the low voltage PMOS transistors is greater than a difference between the amplitudes of the supply voltage and a threshold voltage of the PMOS transistors.

4. The voltage regulation and modulation circuit of claim 1, wherein the adjustable impedance circuit comprises a plurality of resistors coupled in parallel, and a plurality of respective switches coupled in series with the plurality of resistors.

5. The voltage regulation and modulation circuit of claim 4, wherein the plurality of respective resistors have geometrically progressive resistance values, respectively.

6. The voltage regulation and modulation circuit of claim 4, wherein the plurality of respective resistors have substantially equal resistance values.

7. The voltage regulation and modulation circuit of claim 1, wherein the adjustable impedance circuit comprises a plurality of transistors.

8. The voltage regulation and modulation circuit of claim 1, further comprising an encoder configured to output a codeword for adjusting the impedance value of the adjustable impedance circuit.

9. The voltage regulation and modulation circuit of claim 8, wherein the encoder comprises a modulation input for receiving a modulation signal, and is configured to output the codeword for adjusting the impedance value of the adjustable impedance circuit to negatively modulate the input voltage based on the modulation signal.

10. The voltage regulation and modulation circuit of claim 9, wherein the encoder is configured to output the codeword for adjusting the impedance value of the adjustable impedance circuit to its lowest impedance value.

11. The voltage regulation and modulation circuit of claim 9, wherein the encoder is configured to output the codeword for adjusting the impedance value of the adjustable impedance circuit to negatively and positively modulate the input voltage based on the modulation signal.

12. The voltage regulation and modulation circuit of claim 1, further comprising a voltage regulation loop coupled to an input of the adjustable impedance circuit, and configured to adjust the impedance value of the adjustable impedance circuit.

13. The voltage regulation and modulation circuit of claim 12, wherein the voltage regulation loop comprises:
    an error detector circuit coupled to the input of the adjustable impedance circuit, and configured to output an error voltage based on a difference between the amplitude of the reference voltage and a peak amplitude of the input voltage;
    a comparator coupled to an output of the error detector circuit, and configured to output an up/down signal based on a difference between the amplitudes of the error voltage and a threshold voltage;
    a counter circuit coupled to the output of the comparator, and configured to increment/decrement a count value based on the up/down signal; and
    an encoder coupled to the output of the counter circuit, and configured to output a codeword, which is based on the count value and used to adjust the impedance value of the adjustable impedance circuit.

14. The voltage regulation and modulation circuit of claim 13, wherein the counter circuit is a linear counter circuit.

15. The voltage regulation and modulation circuit of claim 13, wherein the counter circuit is a geometrically progressive counter circuit.

16. The voltage regulation and modulation circuit of claim 13, wherein the counter circuit comprises a hold signal input for receiving a hold signal during data communication by the contactless device, thereby causing the counter circuit and the voltage regulation loop to be deactivated.

17. The voltage regulation and modulation circuit of claim 12, wherein the voltage regulation loop is configured to increase the impedance value of the adjustable impedance circuit when the amplitude of the input voltage is less than the amplitude of the reference voltage.

18. The voltage regulation and modulation circuit of claim 12, wherein at startup, the voltage regulation loop is configured to adjust the impedance value of the adjustable impedance circuit to its lowest impedance value.

19. A method of performing voltage regulation and modulation in a contactless device, comprising:
    adjusting an adjustable impedance circuit to maintain an amplitude of an input voltage to be less than an amplitude of a reference voltage;
    buffering a supply current, which is output by the adjustable impedance circuit, to a load; and
    maintaining a constant supply voltage at the load, by a parallel regulator.

20. The voltage regulation and modulation method of claim 19, wherein the step of adjusting comprises performing a voltage regulation loop comprising:
- generating an error voltage based on a difference between an amplitude of a reference voltage and a peak amplitude of the input voltage;
- generating an up/down signal based on a difference between the amplitudes of the error voltage and a threshold voltage;
- incrementing/decrementing a count value based on the up/down signal; and
- generating a codeword, which is based on the count value and used to adjust the impedance value of the adjustable impedance circuit.

21. The voltage regulation and modulation method of claim 19, wherein the step of adjusting comprises performing a voltage regulation loop, the method further comprising:
- deactivating the voltage regulation loop during data communication by the contactless device; and
- generating a codeword for adjusting the impedance value of the adjustable impedance circuit to negatively modulate the input voltage.

22. The voltage regulation and modulation method of claim 21, wherein the step of generating a codeword comprises generating the codeword for adjusting the impedance value of the adjustable impedance circuit to its lowest impedance value.

23. The voltage regulation and modulation method of claim 19, wherein the step of adjusting comprises performing a voltage regulation loop, the method further comprising:
- deactivating the voltage regulation loop during data communication by the contactless device; and
- generating a codeword for adjusting the impedance value of the adjustable impedance circuit to negatively and positively modulate the input voltage.

24. The voltage regulation and modulation method of claim 19, further comprising:
- at startup, adjusting the impedance value of the adjustable impedance circuit to its lowest impedance value.

25. A voltage regulation and modulation circuit of a contactless device, comprising:
- an adjustable impedance means for maintaining an amplitude of an input voltage to be less than an amplitude of a reference voltage;
- a current buffer means for buffering a supply current, which is output from the adjustable impedance means, to a load; and
- a parallel regulator means for maintaining a constant supply voltage at the load.

* * * * *